(12) United States Patent
Tsurutani et al.

(10) Patent No.: US 8,945,246 B2
(45) Date of Patent: Feb. 3, 2015

(54) METHOD FOR PRODUCING LIQUEFIED FUEL OIL USING BIOMASS AS FEEDSTOCK

(75) Inventors: Kazushi Tsurutani, Toyota (JP); Hitoshi Hayashi, Toyota (JP); Tsutomu Sakai, Kyoto (JP); Mitsuru Kondo, Kyoto (JP); Hitoshi Nakajima, Kyoto (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 228 days.

(21) Appl. No.: 12/670,208

(22) PCT Filed: Jul. 18, 2008

(86) PCT No.: PCT/JP2008/063457
§ 371 (c)(1),
(2), (4) Date: Jan. 22, 2010

(87) PCT Pub. No.: WO2009/014225
PCT Pub. Date: Jan. 29, 2009

(65) Prior Publication Data
US 2010/0192457 A1    Aug. 5, 2010

(30) Foreign Application Priority Data

Jul. 25, 2007  (JP) ................................. 2007-193166
Jun. 25, 2008  (JP) ................................. 2008-165185

(51) Int. Cl.
*C10L 1/10*  (2006.01)
*C10L 1/02*  (2006.01)
(Continued)

(52) U.S. Cl.
CPC . *C10L 1/02* (2013.01); *C10G 1/002* (2013.01); *C10G 1/02* (2013.01); *C10G 1/065* (2013.01);
(Continued)

(58) Field of Classification Search
CPC .......... C10G 1/002; C10G 1/02; C10G 1/065;
C10G 2300/1014; C10G 2300/4012; C10G 2300/4081; C10G 2300/44; C10L 1/02
USPC ..................................... 44/605; 585/240, 242
See application file for complete search history.

(56) References Cited

U.S. PATENT DOCUMENTS 4,052,292 A  10/1977  Espenscheid et al.
4,089,773 A  5/1978   Espenscheid
(Continued)

FOREIGN PATENT DOCUMENTS

CN   101113348 A   1/2008
JP   60-262888 A   12/1985
(Continued)

OTHER PUBLICATIONS

David Wolf et al.: "Energy from biomass through direct liquefaction", Perspectives in Energy, 1994-1995, vol. 3, pp. 391-404.
(Continued)

*Primary Examiner* — James Goloboy
*Assistant Examiner* — Latosha Hines
(74) *Attorney, Agent, or Firm* — Sughrue Mion, PLLC (57) ABSTRACT

An object of the present invention is to provide a method for producing a liquefied fuel oil using biomass as a feedstock, in which a relatively inexpensive liquefaction apparatus is used; a good balance is maintained between the liquefaction of water-insoluble lignin and the liquefaction of water-soluble cellulose to achieve a high yield of the liquefied fuel oil based on the biomass solids content; and the amount of ash derived from an alkali catalyst and the like is low. The method for producing a liquefied fuel oil using biomass as a feedstock is characterized by adding, to biomass comprising lignocellulose, a solvent comprising an organic solvent and having a moisture content adjusted to 10 to 25 wt %, including moisture contained in the biomass, and liquefying the biomass at a temperature of 250 to 350° C.

4 Claims, 2 Drawing Sheets

(51) Int. Cl.
*C10G 1/00* (2006.01)
*C10G 1/02* (2006.01)
*C10G 1/06* (2006.01)

(52) U.S. Cl.
CPC ..... *C10G 2300/1014* (2013.01); *C10G 2300/4012* (2013.01); *C10G 2300/4081* (2013.01); *C10G 2300/44* (2013.01)
USPC ............................. 44/605; 585/240; 585/242

(56) References Cited

U.S. PATENT DOCUMENTS

| | | | |
|---|---|---|---|
| 4,145,188 | A | 3/1979 | Espenscheid et al. |
| 4,247,384 | A | 1/1981 | Chen et al. |
| 4,266,083 | A | 5/1981 | Huang |
| 4,451,351 | A | 5/1984 | Porter et al. |
| 4,618,736 | A | 10/1986 | Benn et al. |
| 4,935,567 | A | 6/1990 | Yokoyama et al. |
| 5,336,819 | A * | 8/1994 | McAuliffe et al. ........... 585/240 |
| 7,578,927 | B2 | 8/2009 | Marker et al. |
| 8,288,600 | B2 | 10/2012 | Bartek et al. |
| 2007/0100162 | A1 | 5/2007 | Petrus et al. |
| 2008/0053870 | A1 | 3/2008 | Marker et al. |
| 2008/0072478 | A1 | 3/2008 | Cooper |
| 2008/0076945 | A1 | 3/2008 | Marker et al. |
| 2010/0312027 | A1 | 12/2010 | Tsurutani et al. |

FOREIGN PATENT DOCUMENTS

| | | | |
|---|---|---|---|
| JP | 61-066789 | A | 4/1986 |
| JP | 61-073793 | A | 4/1986 |
| JP | 61-115994 | A | 6/1986 |
| JP | 61-225280 | A | 10/1986 |
| JP | 02102295 | A * | 4/1990 |
| JP | 03-258731 | A | 11/1991 |
| JP | 4-75274 | B2 | 11/1992 |
| JP | 05-179253 | A | 7/1993 |
| JP | 09-029202 | A | 2/1997 |
| JP | 3755076 | A | 7/2001 |
| JP | 2005-288406 | A | 10/2005 |
| JP | 2005-296906 | A | 10/2005 |
| JP | 2006-063310 | A | 3/2006 |
| JP | 2006063310 | A * | 3/2006 |
| JP | 2009-046661 | A | 3/2009 |
| WO | WO 2004/037730 | A2 | 5/2004 |
| WO | 2008/039756 | A2 | 4/2008 |
| WO | 2009/000838 | A2 | 12/2008 |
| WO | 2009/014225 | A1 | 1/2009 |

OTHER PUBLICATIONS

M. M. Kücük: "Liquefaction of Biomass by Supercritical Gas Extraction", Energy Sources, 23:363-368, 2001.
Jun Yamazaki et al.: "Liquefaction of beech wood in various supercritical alcohols", The Japan Wood Research Society (2006) 52:527-532.
Gang Wang et al.: "Direct liquefaction of sawdust under syngas", ScienceDirect, Fuel 86 (2007) 1587-1593.
Yun Yang et al.: Production of Bio-Crude from Forestry Waste by Hydro-Liquefaction in Sub-/Super-Critical Methanol, Environmental and Energy Engineering, pp. 807-819, vol. 55, No. 3, Mar. 2009.
Hui Li et al.: "Liquefaction of rice straw in sub- and supercritical 1,4-dioxane-water mixture", Fuel Processing Technology 90 (2009), pp. 657-663.
Katsumi Hirano et al.: "Study on Direct Liquefaction of Wood Biomass", (received Nov. 6, 2003), Journal of the Japan Institute of Energy, 83, pp. 770-775 (2004).
Yejian Qian et al.: "Structural analysis of bio-oils from sub- and supercritical water liquefaction of woody biomass" (received Dec. 30, 2005), ScienceDirect, Energy 32 (2007), pp. 196-202.
Chunbao Xu et al.: "Production of Heavy Oils with High Caloric Values by Direct Liquefaction of Woody Biomass in Sub/Near-critical Water" (revised manuscript received Oct. 3, 2007), Energy & Fuels 2008, 22, pp. 635-642.
Non-Final Office Action issued May 8, 2013 ( U.S. Appl. No. 12/794,386).
A.V. Bridgewater, et al., "Production of high grade fuels and chemicals from catalytic pyrolysis of biomass," Catalysis Today, 1996, pp. 285-295, vol. 29.

* cited by examiner

METHOD FOR PRODUCING LIQUEFIED FUEL OIL USING BIOMASS AS FEEDSTOCK

CROSS REFERENCE TO RELATED APPLICATION

This application is a National Stage of International Application No. PCT/JP2008/063457 filed Jul. 18, 2008, claiming priority based on Japanese Patent Application Nos. 2007-193166 and 2008-165185, filed Jul. 25, 2007 and Jun. 25, 2008 respectively, the contents of all of which are incorporated herein by reference in their entirety.

TECHNICAL FIELD

The present invention relates to a method for producing a liquefied fuel oil using biomass as a feedstock; and more particularly, to a method for producing a liquefied fuel oil from biomass wherein a solvent is added to biomass, and the biomass is liquefied at a temperature where pyrolysis of the biomass occurs.

BACKGROUND ART

Examples of conventional methods for producing liquefied fuel oils using biomass as feedstocks are as follows. In Patent Documents 1 to 3, a liquefaction catalyst for biomass, which is potassium carbonate dissolving in water, and biomass, which is wood chips, are processed at 200 to 385° C., thereby producing a liquefied fuel oil in a yield of 23 to 45 wt % based on the biomass solids content.

In Patent Document 4, wood chips, water, a neutral oxygenated solvent (acetone, methyl ethyl ketone, ethyl acetate, 1-butanol, etc.), and potassium carbonate are processed at 300° C., thereby producing a liquefied fuel oil in a yield of 33 to 68 wt % based on the biomass solids content.

In Patent Document 5, wood chips, water, a phenolic compound (phenol or cresol), and an alkali metal compound or alkaline earth metal compound (potassium carbonate, sodium carbonate, calcium carbonate, sodium hydroxide, calcium hydroxide, etc.) are processed at 350° C., thereby producing a liquefied fuel oil in a yield of 47 to 65 wt % based on the biomass solids content.

In Patent Document 6, cellulosic biomass and one type of organic solvent selected from aliphatic ketones and fatty alcohols (acetone, methyl ethyl ketone, methanol, ethanol, etc.) are subjected to pyrolysis at a temperature equal to or higher than a supercritical temperature in the presence of an activated carbon catalyst, thereby producing a liquefied fuel oil in a yield of about 50 wt % based on the biomass solids content.

In Patent Document 7, lignocellulosic biomass is processed with a supercritical alcohol (methanol, etc.) at 320 to 360° C., thereby producing a liquefied fuel oil that is alcohol-soluble in a yield of about 70 wt % based on the biomass solids content.

In Patent Document 8, biomass is processed with 1-octanol at 195 to 500° C., thereby producing a liquefied fuel oil in a maximum yield of about 90 wt % based on the biomass solids content.

In Patent Document 9, biomass is processed with a mixed solvent obtained by adding 5 to 20 vol % of water to a fatty alcohol having 1 to 8 carbon atoms (methanol, etc.), under supercritical or subcritical conditions for the alcohol, thereby producing a liquefied fuel oil in a maximum yield of 95 wt % based on the biomass solids content.

In Patent Document 10, ligneous biomass is processed with an organic solvent such as anthracene at 250 to 400° C., thereby producing a liquefied fuel oil that is soluble in acetone in a yield of 45 wt % based on the biomass solids content. Part of the liquefied fuel oil produced is circulated for use as a solvent for processing biomass.

In Patent Document 11, ligneous biomass is processed with a mixed solution of polyethylene glycol/glycerol/sulfuric acid=70/30/3 (170 to 200° C.), thereby producing a liquefied fuel oil in a yield of 45 wt % based on the biomass solids content.

Patent Document 1: JP Patent Publication (Kokoku) No. 3-36870 B (1991)
Patent Document 2: JP Patent Publication (Kokoku) No. 3-36871 B (1991)
Patent Document 3: JP Patent Publication (Kokoku) No. 4-75274 B (1992)
Patent Document 4: JP Patent Publication (Kokoku) No. 3-36872 B (1991)
Patent Document 5: JP Patent Publication (Kokoku) No. 3-41516 B (1991)
Patent Document 6: JP Patent Publication (Kokoku) No. 6-29438 B (1994)
Patent Document 7: JP Patent No. 3755076
Patent Document 8: JP Patent Publication (Kokai) No. 2005-288406 A
Patent Document 9: JP Patent Publication (Kokai) No. 2005-296906 A
Patent Document 10: JP Patent Publication (Kokai) No. 2006-063310 A
Patent Document 11: JP Patent Publication (Kokai) No. 2004-075928 A

DISCLOSURE OF THE INVENTION

In the methods for producing liquefied fuel oils using biomass as feedstocks disclosed in the above-mentioned Patent Documents 1 to 3, water-insoluble lignin is not sufficiently liquefied because water is used alone as a solvent for liquefaction, resulting in low yields of the liquefied fuel oils based on the biomass solids content. Moreover, because potassium carbonate is used as a liquefaction catalyst, it remains in the liquefied fuel oil as ash.

In the method for producing a liquefied fuel oil using biomass as a feedstock disclosed in the above-mentioned Patent Document 4, the liquefaction of water-insoluble lignin has been improved by using 5 parts of water and 1 part of a neutral oxygenated solvent as solvents for liquefaction. However, the effect obtained is not sufficient, and the yield of the liquefied fuel oil based on the biomass solids content has not substantially improved. Moreover, as in Patent Documents 1 to 3, because an inorganic alkaline material is used as a liquefaction catalyst, it remains in the liquefied fuel oil as ash.

In the method for producing a liquefied fuel oil using biomass as a feedstock disclosed in the above-mentioned Patent Document 5, the liquefaction of water-insoluble lignin has been improved by using a mixed solvent of water/phenolic compound=5/1 to 1/1 as a solvent. However, the effect obtained is not sufficient, and the yield of the liquefied fuel oil based on the biomass solids content has not substantially improved. Moreover, as in Patent Documents 1 to 4, because an inorganic alkaline material is used as a liquefaction catalyst, it remains in the liquefied fuel oil as ash.

In the method for producing a liquefied fuel oil using biomass as a feedstock disclosed in the above-mentioned Patent Document 6, one type of organic solvent selected from aliphatic ketones and fatty alcohols is used as a solvent. However, the biomass decomposition reaction does not proceed sufficiently, and the yield of the liquefied fuel oil based on the biomass solids content has not substantially improved.

In the method for producing a liquefied fuel oil using biomass as a feedstock disclosed in the above-mentioned Patent Document 7, an alcohol (methanol, etc.) in a supercritical state is used as a solvent, thereby improving the yield of the liquefied fuel oil based on the biomass solids content up to 70 wt %. However, an expensive liquefaction reactor is necessary because the pressure at which the biomass is liquefied is as high as 43 MPa.

In the method for producing a liquefied fuel oil using biomass as a feedstock disclosed in the above-mentioned Patent Document 8, 1-octanol is used as a solvent, thereby improving the yield of the liquefied fuel oil based on the biomass solids content up to 90 wt %. However, the amount of 1-octanol used is as large as 32.7 liters per kilogram of biomass, making the cost for heating the solvent high.

In the method for producing a liquefied fuel oil using biomass as a feedstock disclosed in the above-mentioned Patent Document 9, a mixed solvent obtained by adding 5 to 20 vol % of water to a fatty alcohol having 1 to 8 carbon atoms (methanol, etc.) is used as a solvent, thereby improving the yield of the liquefied fuel oil based on the biomass solids content up to 95 wt %. However, because the moisture content in the biomass has not been considered, the yield decreases when biomass with a high moisture content is used.

In the method for producing a liquefied fuel oil using biomass as a feedstock disclosed in the above-mentioned Patent Document 10, a heavy oil (anthracene, etc.) is used as a solvent. However, the biomass decomposition reaction does not proceed sufficiently, and the yield of the liquefied fuel oil based on the biomass solids content has not substantially improved.

In the method for producing a liquefied fuel oil using biomass as a feedstock disclosed in the above-mentioned Patent Document 11, a mixed solution of polyethylene glycol/glycerol/sulfuric acid=70/30/3 is used as a solvent, thereby improving the yield of the liquefied fuel oil based on the biomass solids content up to 90 wt %. However, because sulfuric acid is used as an acid catalyst, a valuable material such as nickel alloy must be used for the material of the liquefaction reactor, resulting in very high costs for plant equipment.

The present invention has been made in view of the above-described circumstances. Accordingly, an object of the present invention is to provide a method for producing a liquefied fuel oil using biomass as a feedstock, in which a relatively inexpensive liquefaction apparatus can be used; a good balance can be maintained between the liquefaction of water-insoluble lignin and the liquefaction of water-soluble cellulose, thus enabling the yield of the liquefied fuel oil based on the biomass solids content to be improved; and the residual amount of ash derived from an alkali catalyst and the like is low.

The present inventors conducted extensive research in view of the current state of the prior art, in order to achieve the above-mentioned object. Consequently, they found a method for producing a liquefied fuel oil using biomass as a feedstock, comprising adding a solvent containing an organic solvent and having a moisture content adjusted to 10 to 25 wt %, including the moisture contained in the biomass, and liquefying the biomass at a temperature of 250 to 350° C. where pyrolysis of the biomass occurs, thereby enabling the use of a relatively inexpensive liquefaction apparatus; maintaining a good balance between the liquefaction of water-insoluble lignin and the liquefaction of water-soluble cellulose, and thus achieving a high yield of the liquefied fuel oil based on the biomass solids content; and achieving a low residual amount of ash derived from an alkali catalyst. The present invention has been accomplished based on this finding.

In summary, the present invention relates to a method for producing a liquefied fuel oil using biomass as a feedstock as set forth below.

In order to achieve the above-mentioned object, a method for producing a liquefied fuel oil using biomass as a feedstock comprises adding, to biomass comprising lignocellulose, a solvent comprising an organic solvent and having a moisture content adjusted to 10 to 25 wt %, including the moisture contained in the biomass, and liquefying the biomass at a temperature of 250 to 350° C.

According to the above features, the biomass is liquefied while maintaining the balance between the water for promoting the hydrolysis reaction of cellulose or hemicellulose and the organic solvent that dissolves the decomposition product of lignin, in consideration of the moisture content in the biomass used as a feedstock. Thus, the yield of the liquefied fuel oil based on the biomass solids content can be improved.

The method for producing a liquefied fuel oil using biomass as a feedstock may be characterized in that the solvent is added in an amount 5 to 20 times the weight of a biomass solids content.

According to the above feature, the amount of the solvent added to promote the liquefaction of biomass is moderate, i.e., 5 to 20 times the biomass solids content; therefore, the quantity of heat necessary to heat the solvent to the reaction temperature can be reduced. The term "solids content" herein represents the dry weight of the biomass excluding the moisture content.

The method for producing a liquefied fuel oil using biomass as a feedstock may be characterized in that the solvent comprises neither an acid catalyst nor an alkali catalyst.

According to the above feature, neither an acid nor an alkali is used as a biomass liquefaction catalyst, thus enabling a liquefied fuel oil having a low ash content to be produced. Furthermore, because an acid is not used as a biomass liquefaction catalyst, stainless steel, which is a general material used for liquefaction apparatuses, can be used.

The method for producing a liquefied fuel oil using biomass as a feedstock may be characterized in that the solvent comprises an organic solvent having 3 to 12 carbon atoms.

According to the above feature, the solubility of the decomposition product of cellulose or lignin can be improved, enabling the yield of the liquefied fuel oil based on the biomass solids content to be improved.

The method for producing a liquefied fuel oil using biomass as a feedstock may be characterized in that the solvent comprises an aromatic hydrocarbon solvent as the organic solvent.

According to the above feature, the proportion of the product obtained as an aqueous-phase component or a gaseous component in the products obtained by liquefaction is reduced, enabling the yield of a useful liquefied fuel oil to be further improved.

The method for producing a liquefied fuel oil using biomass as a feedstock may be characterized in that a liquefied fuel oil after liquefaction is contacted with a dehydration catalyst, thereby dehydrating the liquefied fuel oil.

According to the above feature, the heat value of the liquefied fuel oil can be improved by dehydrating the liquefied fuel oil produced from the biomass.

The method for producing a liquefied fuel oil using biomass as a feedstock may be characterized in that the liquefied fuel oil after liquefaction comprising an aromatic hydrocarbon solvent is contacted with a dehydration catalyst to be dehydrated; the resulting liquefied fuel oil comprising an aromatic hydrocarbon solvent is separated into the aromatic hydrocarbon solvent and the liquefied fuel oil; and the separated aromatic hydrocarbon solvent is recycled for use in liquefaction of biomass.

According to the above features, the heat value of the liquefied fuel oil can be improved by dehydration. Furthermore, the solvent used in the liquefaction can be recovered and used effectively.

The method for producing a liquefied fuel oil using biomass as a feedstock may be characterized in that the aromatic hydrocarbon solvent is xylene.

According to the above feature, the yield of the liquefied fuel oil can be improved; moreover, a high recovery rate can be achieved when recycling the solvent, because the solvent does not deteriorate due to the dehydration catalyst.

This application claims priority to JP Application Nos. 2008-165185 and 2007-193166, of which the contents of the specifications and/or drawings are herein incorporated by reference in their entirety.

DESCRIPTION OF SYMBOLS

1 Solvent storage tank
2 Solvent
3 Solvent transfer line
4 Solvent transfer pump
5 Solvent heater
6 Biomass liquefaction reactor
7 Biomass
8 Dehydration catalyst for liquefied fuel oil
9 Perforated plate
10 Heating device of biomass liquefaction reactor
11 Transfer line for liquefied fuel oil
12 Gas/liquid separation tank
13 Gas product
14 Liquefied fuel oil
15 Gas product transfer line
16 Gas product withdrawal valve
17 Liquefied fuel oil transfer line
18 Liquefied fuel oil withdrawal valve
19 Storage tank for liquefied fuel oil
20 Liquefied fuel oil transfer line
23 Liquefied fuel oil transfer line
24 Liquefied fuel oil transfer pump
25 Liquefied fuel oil heater
26 Liquefied fuel oil dehydration reactor
28 Dehydration catalyst
29 Perforated plate
30 Heating device of liquefied fuel oil dehydration reactor
31 Transfer line for dehydrated liquefied fuel oil
32 Gas/liquid separation tank
33 Gas product
34 Dehydrated liquefied fuel oil
35 Gas product transfer line
36 Gas product withdrawal valve
37 Dehydrated liquefied fuel oil transfer line
38 Dehydrated liquefied fuel oil withdrawal valve
39 Recovery device for liquefaction solvent
40 Recovered solvent line
41 Dehydrated liquefied fuel oil transfer line

BEST MODE FOR CARRYING OUT THE INVENTION

The present invention is described in detail below based on embodiments.

The biomass of the invention includes lignocellulose. Lignocellulose is an organic compound composed of structural polysaccharides, i.e., cellulose and hemicellulose, and lignin. Biomass containing such lignocellulose can be used as a feedstock for the liquefied fuel oil of the present invention. The lignocellulose content in the biomass is not particularly limited, but lignocellulose is preferably a principal component of the biomass. By "principal component" is meant that the proportion of the lignocellulose component in the biomass is high; specifically, it is preferable to use biomass whose total content of the lignin component, cellulose component, and hemicellulose component in the solids content excluding the moisture content from the biomass is at least 50 wt %, and preferably 80 wt %. Specific examples of such biomass include staple crops such as wheat, rice, corn, soybean, barley, sorghum, sugarcane, potatoes, cassava, sugar beet, and residues thereof; oil crops such as palm, sunflower, rapeseed, *Jatropha curcas*, peanuts, castor-oil plant, and residues thereof; energy crops such as aleman grass, reed grass, cardoon, kenaf, *Miscanthus*, poplar, tall fescue, napier grass, guinea grass, willow, and switch grass; forestry wastes such as forest residues, thinnings, and industrial residual scrap wood; municipal wastes, and industrial wastes such as scrap wood from construction, pruning residues, and waste paper; residues of lignocellulose saccharification; ethanol distillation waste; etc.

The organic solvent used as a solvent for liquefaction is not particularly limited as long as it is fluid. Specific examples of such organic solvents include paraffins, cyclic hydrocarbons, aromatic hydrocarbons, alcohols, phenols, ethers, ketones, esters, and combinations thereof.

Examples of paraffins include n-hexane, n-heptane, n-octane, n-nonane, n-decane, n-dodecane, and isomers thereof.

Examples of cyclic hydrocarbons include cyclopentane, cyclohexane, and methylcyclohexane.

Examples of aromatic hydrocarbons include benzene, toluene, ethylbenzene, o-xylene, m-xylene, p-xylene, cumene, naphthalene, anthracene, and biphenyl.

Examples of alcohols include methanol, ethanol, diethylene glycol, 1-propanol, isopropyl alcohol, glycerol, n-butanol, 2-butanol, isobutanol, t-butyl alcohol, 1-pentanol, 2-methyl-1-butanol, 3-methyl-1-butanol, 2-methyl-2-butanol, 2,2-dimethyl-1-propanol, 1-hexanol, cyclohexanol, diethylene glycol, polyethylene glycol, and polyglycerol.

Examples of phenols include phenol, o-cresol, m-cresol, and p-cresol.

Examples of ethers include diethylether, ethyl propyl ether, and ethyl butyl ether.

Examples of ketones include acetone, methyl ethyl ketone, and diethyl ketone.

Examples of esters include methyl formate, ethyl formate, methyl acetate, ethyl acetate, and methyl butyrate.

In particular, an organic solvent having 3 to 12 carbon atoms can be suitably used to increase the solubility of the decomposition product of cellulose or lignin. Examples of such organic solvents include paraffin solvents such as n-octane, n-nonane, and n-decane; and aromatic solvents such as benzene, toluene, xylene, and naphthalene. Among the above, alcohols having 2 to 6 carbon atoms and aromatic hydrocarbons having 6 to 12 carbon atoms are preferable; and 1-butanol and xylene are most preferable. In particular, the use of aromatic hydrocarbon solvents such as xylene can further improve the yield of the liquefied fuel oil as the final product. Moreover, solvents such as xylene do not easily deteriorate due to a dehydration catalyst, and hence, can be recovered for recycling.

A liquefied fuel oil can be produced by processing the above-described biomass containing lignocellulose by adding a solvent containing a predetermined organic solvent. The production method of the present invention will be next described in detail, referring to the drawings.

Figure 1:
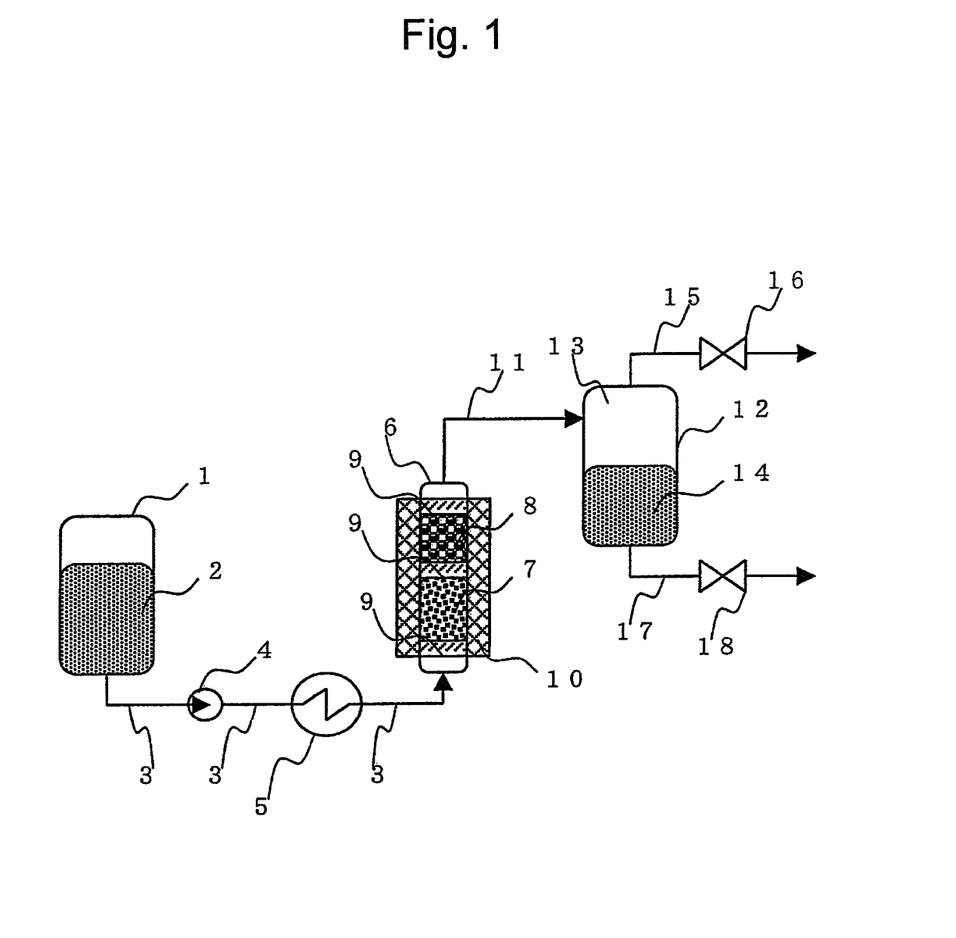
FIG. 1 is a diagram showing a first embodiment of the apparatus used in the production method of the present invention.

FIG. 1 is a diagram showing a first embodiment of the apparatus used in the method of the present invention for producing a liquefied fuel oil using biomass as a feedstock. As shown in FIG. 1, the production apparatus includes a liquefaction solvent storage tank 1, a solvent transfer pump 4, a solvent heater 5, a biomass liquefaction reactor 6, a gas/liquid separation tank 12, a gas product withdrawal valve 16, a liquefied fuel oil withdrawal valve 18, and a line that connects these components. The apparatus of FIG. 1 is of a semi-continuous operation-type in which the solvent is continuously fed, and biomass is fed in batches; however, the apparatus is not limited thereto. The apparatus may be of a batch operation-type in which the solvent and biomass are injected simultaneously into the liquefaction reactor where liquefaction is performed, or may be of a continuous operation-type in which a slurry containing biomass dispersed in a solvent is continuously fed to the liquefaction reactor via a transfer pump.

Generally, the moisture content in the biomass to be liquefied varies greatly depending on the type and the like of the biomass. Specifically, examples of types of biomass and the moisture contents therein are as follows: sawdust (15 to 60 wt %); sorghum (20 to 70 wt %); switch grass (30 to 70 wt %); giant kelp (85 to 97 wt %); eucalyptus (30 to 60 wt %); poplar (30 to 60 wt %); paper (3 to 13 wt %); and straw (5 to 15 wt %). The moisture content in the biomass varies depending on its type and condition (the harvest time, the condition after harvest, etc.). Therefore, if a solvent with a constant composition is used as in the conventional manner, the moisture content in the reaction field will vary greatly for each processing. Consequently, if, for example, the moisture content is too high, the decomposition of cellulose or hemicellulose will be promoted, but the decomposition product will merely dissolve in the aqueous phase at a low concentration, resulting in an inability to obtain a yield of the liquefied fuel oil. For this reason, the production method of the present invention is characterized by adding a solvent having a moisture content adjusted to 10 to 25 wt %, including the moisture contained in the biomass, in consideration of the moisture content in the biomass. This improves the balance between the liquefaction of water-insoluble lignin and the liquefaction of water-soluble cellulose. That is, the cellulose and hemicellulose are decomposed at a minimum required moisture content, while the remaining organic solvent promotes the decomposition of lignin. This allows the maximum amount of the biomass decomposition product to be dissolved in the organic phase, thereby improving the yield of the liquefied fuel oil.

If the moisture content in the solvent including the moisture contained in the biomass is less than 10 wt %, the hydrolysis of lignin and cellulose does not proceed sufficiently; whereas if the moisture content exceeds 25 wt %, the yield of the liquefied fuel oil will decrease, which is undesirable. When 1-butanol is used as an organic solvent, the amount of water added is particularly preferably 15 to 25 wt %, including the moisture contained in the biomass. The moisture content in the solvent added is reliably adjusted by measuring the moisture content in the biomass by a gravimetric method, and subsequently adjusting the moisture content in the solvent to 10 to 25 wt %, including the measured moisture content in the biomass. If, however, the moisture content in the biomass alone exceeds 25 wt % of the solvent, the biomass is preferably dried prior to liquefaction so that the moisture content can be adjusted to 10 to 25 wt % when a solvent is added. For example, biomass having a moisture content of about 80 to 90 wt % may be dried to a moisture content of less than 50 wt % by means such as heating and drying, and then a solvent having a moisture content of 0 to 20 wt % may be added to the biomass.

The solvent storage tank 1 stores a solvent 2 that has been adjusted to a moisture content of 10 to 25 wt %, including the moisture contained in the biomass, at room temperature or in a heated state. If the organic solvent and water in the solvent do not completely dissolve with each other, the solvent cannot be fed homogeneously. Therefore, an organic solvent storage tank, a water storage tank, as well as transfer lines and transfer pumps individually for the organic solvent and water may be provided, and the organic solvent and water may be mixed at the transfer line immediately before the solvent heater 5. In this case, the flow rate of the water fed is adjusted so as to achieve a moisture content of 10 to 25 wt %, including the moisture contained in the biomass.

The solvent storage tank 1 is not particularly limited as long as it employs a configuration and material that can store the solvent; the storage tank 1 may be metallic, glass, plastic, or ceramic. When the solvent is stored at room temperature or a temperature lower than the boiling point, a storage tank suitable for atmospheric pressure may be used. When the solvent is stored at a temperature equal to or higher than the boiling point, a sealed pressurized storage tank is selected.

The flow rate of the solvent is selected to be 5 to 20 times the weight of the biomass solids content. If the amount of the solvent is less than 5 times the biomass solids content, the decomposition and liquefaction reactions will not occur; whereas if the amount exceeds 20 times, an extremely large quantity of energy will be consumed for heating the solvent, which is undesirable. In consideration of the relationship between the yield of the liquefied fuel oil and the energy for heating the solvent, the flow rate of the solvent is particularly preferably between 8 to 15 times the weight of the biomass solids content.

The solvent 2 stored in the solvent storage tank 1 is transferred to the solvent transfer line 3, and thence to the solvent transfer pump 4, where it is pressurized to a pressure equal to or higher than the vapor pressure of the solvent, and is subsequently heated by the solvent heater 5 to a predetermined reaction temperature.

The solvent transfer pump 4 used herein is not particularly limited as long as it can pressurize the solvent to a predetermined pressure; usable pumps include a gear pump, a multi-stage swirl pump, a cylinder pump, a plunger pump, a diaphragm pump, a rotary pump, a snake pump, and the like.

The solvent heater 5 is not particularly limited as long as it can heat the solvent to a predetermined temperature; it is selected from a double tube heater, a shell and tube heater, a U tube heater, a spiral heater, a plate heater, an electric heater, an induction heater, and the like.

The solvent heating temperature is suitably adjusted within the range of 250 to 350° C. where the biomass undergoes pyrolysis and liquefaction reactions, in consideration of the combination of the solvent and biomass feedstock. The heating temperature is preferably within the range of 275 to 325° C. When oak chips are used as biomass, and 1-butanol is used as an organic solvent, the reaction temperature is preferably between 280 to 320° C., in order to improve the yield of the liquefied fuel oil.

The solvent 2 heated to a predetermined temperature by the solvent heater 5 is fed to the biomass liquefaction reactor 6 via the solvent transfer line 3. The biomass liquefaction reactor 6 is charged with biomass 7 that has been suitably dried, for example, an oak powder which is biomass chips ground to 1 mm or less, and this biomass is reacted with the solvent 2 to undergo the decomposition and liquefaction reactions.

After the biomass has been liquefied, the resulting liquefied fuel oil is contacted with a dehydration catalyst, as required, to be dehydrated. When the liquefied fuel oil is dehydrated, for example, the biomass liquefaction reactor 6 is charged with a dehydration catalyst 8 for liquefied fuel oil that is partitioned by perforated plates 9, as shown in FIG. 1. Dehydration of the liquefied fuel oil can be performed by passing the liquefied fuel oil through the layers of the dehydration catalyst 8. Alternatively, a hydrogenation catalyst may be charged into the biomass liquefaction reactor 6, and used to reform the liquefied fuel oil into hydrogen.

The dehydration catalyst 8 for liquefied fuel oil is not particularly limited as long as it promotes the dehydration reaction; examples of the catalyst include metal oxides such as silicate, alumina, aluminosilicate (zeolite), and titania; and catalysts having metals such as nickel, copper, cobalt, platinum, and palladium deposited on these metal oxides.

The residence time of the solvent 2 in the biomass liquefaction reactor 6 may depend on the configuration of the reactor, but is typically 15 to 60 minutes. When the solvent contains 1-butanol, the residence time is preferably about 30 minutes. The amount of the dehydration catalyst 8 charged is adjusted to a liquid hourly space velocity of 1 to 6 $h^{-1}$.

The biomass liquefaction reactor 6 is maintained at a predetermined temperature by controlling the heating device 10 of the biomass liquefaction apparatus. The heating device 10 of the biomass liquefaction apparatus is not particularly limited; for example, it may be an electric heater installed on the outer surface of the reactor, or may be a jacket provided on the outer surface of the reactor and configured to allow the passage of a heating medium therethrough.

The material of the biomass liquefaction reactor 6 is not particularly limited as long as it can withstand the liquefaction temperature and pressure, as well as solvent corrosion; applicable materials include carbon steel, stainless steel, nickel alloy steel, and lined steel thereof; and ceramic lined steel. The configuration of the biomass liquefaction reactor 6 is not also particularly limited; a vertical tube reactor or a horizontal tube reactor is typically selected, but a loop reactor or a fluidized bed reactor may also be selected.

The liquefied fuel oil and gas product produced by the liquefaction are transferred to the gas/liquid separation tank 12 via the transfer line 11 for liquefied fuel oil. The liquefied fuel oil and gas product are separated into a gas product 13 and a liquefied fuel oil 14 at the gas/liquid separation tank 12, and the gas product 13 is removed out of the system via the gas product transfer line 15 and gas product withdrawal valve 16. The liquefied fuel oil 14, on the other hand, is withdrawn via the liquefied fuel oil transfer line 17 and liquefied fuel oil withdrawal valve 18.

The pressures in the biomass liquefaction reactor 6 and gas/liquid separation tank 12 are maintained at a pressure where the liquefied fuel oil is not vaporized, by regulating the gas product withdrawal valve 16 and liquefied fuel oil withdrawal valve 18.

The material of the gas/liquid separation tank 12 is not particularly limited as long as it can withstand the temperature and pressure of the liquefied fuel oil and gas product, as well as corrosion by the liquefied fuel oil and gas product; applicable materials include carbon steel, stainless steel, nickel alloy steel, and lined steel thereof; and ceramic lined steel. The configuration of the gas/liquid separation tank 12 is not also limited; typically, a vertical tube tank or a horizontal tube tank is selected.

According to the method described above, a relatively inexpensive liquefaction apparatus can be used, and a good balance can be maintained between the liquefaction of water-insoluble lignin and the liquefaction of water-soluble cellulose, enabling the yield of the liquefied fuel oil based on the biomass solids content to be improved. Furthermore, because the solvent for liquefaction contains neither an acid catalyst nor an alkali catalyst, a liquefied fuel oil having a low ash content can be produced.

Figure 2:
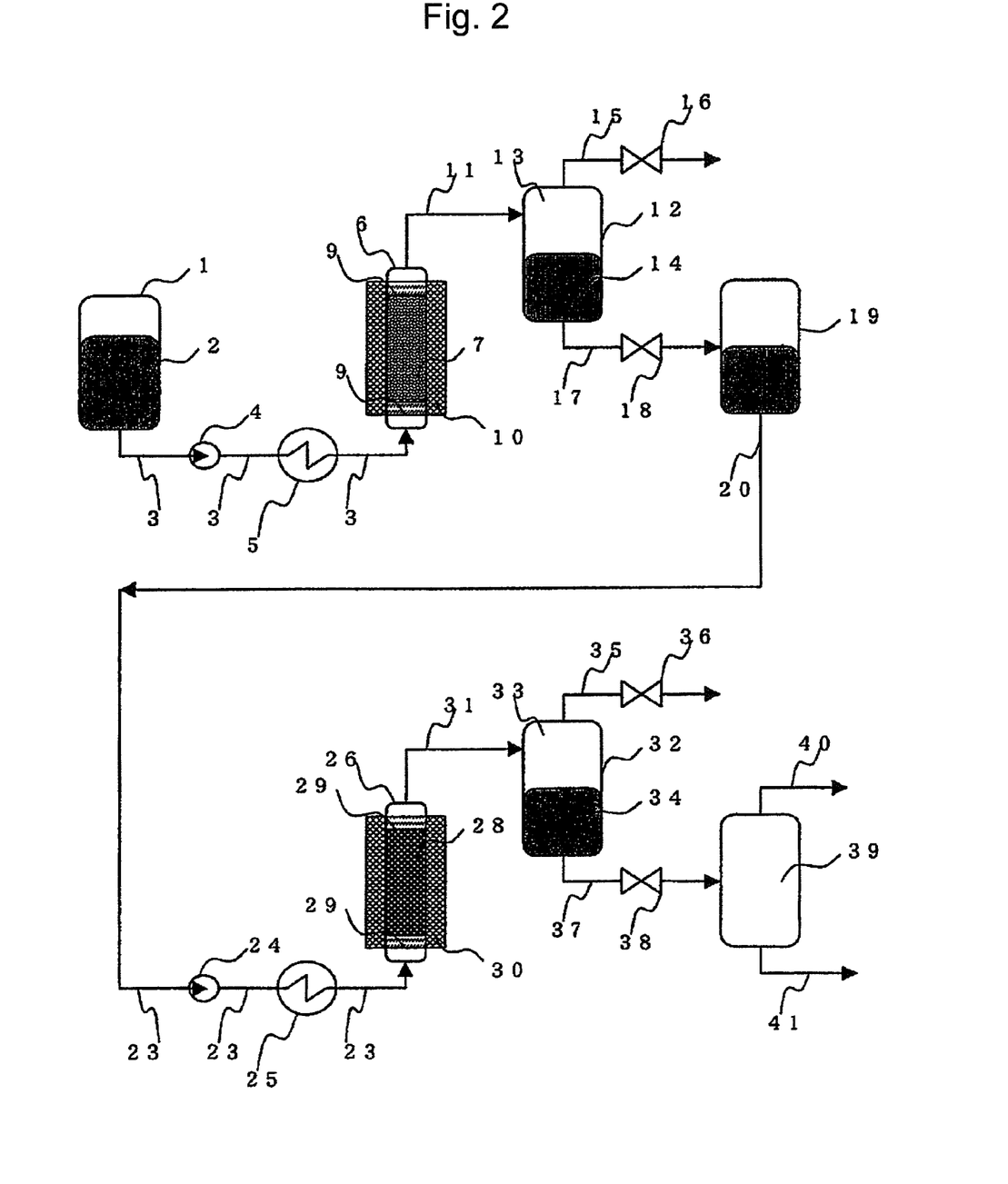
FIG. 2 is a diagram showing a second embodiment of the apparatus used in the production method of the present invention.

FIG. 2 is a diagram showing a second embodiment of the apparatus used in the method of the present invention for producing a liquefied fuel oil using biomass as a feedstock. This embodiment is one in which the solvent used for liquefaction is recovered for recycling, and provides an apparatus configuration that is suitable for cases where the solvent includes an aromatic hydrocarbon solvent such as xylene. In FIG. 2, identical elements to those in the first embodiment are denoted by the same reference numerals as in FIG. 1.

As shown in FIG. 2, a liquefied fuel oil 14 that has been withdrawn via a liquefied fuel oil withdrawal valve 18 is stored once in a storage tank 19 for liquefied fuel oil. When the liquefied fuel oil 14 is obtained by the liquefaction using a solvent containing an aromatic hydrocarbon such as xylene, it contains an aromatic hydrocarbon solvent and water. The liquefied fuel oil 14 containing an aromatic hydrocarbon solvent is subsequently transferred to liquefied fuel oil transfer lines 20, 23, and thence, to a liquefied fuel oil transfer pump 24, where it is pressurized to a predetermined pressure. The liquefied fuel oil is then heated by a liquefied fuel oil heater 25 to a predetermined dehydration reaction temperature, and is subsequently introduced into a liquefied fuel oil dehydration reactor 26. The configuration of each of the storage tank 19 for liquefied fuel oil, transfer lines 20, 23, transfer pump 24, and heater 25 is as described in connection with the configuration of each of the solvent storage tank 1, transfer line 3, transfer pump 4, and heater 5, respectively, in the first embodiment.

The liquefied fuel oil dehydration reactor 26 is charged with a dehydration catalyst 28 in the space partitioned by perforated plates 29. Dehydration of the liquefied fuel oil 14 containing an aromatic hydrocarbon can be performed by passing the liquefied fuel oil 14 through the layer of the dehydration catalyst 28. Further, a heating device 30 of the liquefied fuel oil dehydration reactor is provided around the liquefied fuel oil dehydration reactor 26, allowing the dehydration reaction temperature to be controlled to a predetermined value. The liquefied fuel oil containing an aromatic hydrocarbon that has undergone the dehydration reaction is then subsequently introduced into a gas/liquid separation tank 32 via a transfer line 31 for dehydrated liquefied fuel oil. The configuration of each of the liquefied fuel oil dehydration reactor 26, dehydration catalyst 28, and the like is the same as that in the above-described first embodiment.

The liquefied fuel oil containing an aromatic hydrocarbon is subsequently separated into a gas product 33 and a dehydrated liquefied fuel oil 34 at the gas/liquid separation tank 32, and the gas product 33 is removed out of the system via a gas product transfer line 35 and gas product withdrawal valve 36. On the other hand, the dehydrated liquefied fuel oil 34 containing an aromatic hydrocarbon is introduced into a recovery device 39 for liquefaction solvent via a dehydrated liquefied fuel oil transfer line 37 and dehydrated liquefied fuel oil withdrawal valve 38. The configuration of the gas/liquid separation tank 32 and the like is as described in the above-described first embodiment.

Next, the dehydrated liquefied fuel oil 34 containing an aromatic hydrocarbon is separated into the aromatic hydrocarbon and the dehydrated liquefied fuel oil at the recovery device 39 for liquefaction solvent. The method for separation is not particularly limited; examples of methods include distillation and the like. The separated dehydrated liquefied fuel oil is removed out of the system via a dehydrated liquefied fuel oil transfer line 41, and can be utilized as a high-heat-value liquefied fuel oil. Furthermore, the separated aromatic hydrocarbon can be circulated back into the solvent storage tank 1 via a recovered solvent line 40, and recycled as a solvent for liquefaction.

The present invention will be described next in further detail below, referring to the Examples and Comparative Examples.

Example 1

An oak was ground with a cutter mill and dried; subsequently, the dried product was passed through a 16-mesh sieve, and a powder that did not pass through a 32-mesh sieve (particle size: 1 mm or less) was prepared. This oak powder was further dried with a dryer and adjusted to a moisture content of about 15 wt %. The oak powder adjusted to these particle size and moisture content was charged into a biomass liquefaction reactor in an amount of 7 g (the biomass solids content: 6 g). While 1-butanol (manufactured by Nakalai Tesque; a special grade reagent) for use as a solvent for liquefaction was transferred at a flow rate of 60 g/h via a high-pressure pump, and water transferred at a flow rate of 14 g/h via a separate high-pressure pump, the solvent composed of 1-butanol and water was heated by a solvent heater to a temperature of 300° C., whereupon the solvent was allowed to pass through the biomass liquefaction reactor for 1 hour to effect biomass liquefaction. The reaction pressure during the liquefaction was adjusted to 12 MPaG. Since the liquefaction time was 1 hour in this case, the amount of 1-butanol fed to the biomass was 60 g, and the sum of the moisture content in the biomass and the amount of water fed to the biomass was 1+14 g=15 g; hence, the moisture content in the solvent including the moisture contained in the biomass was 15 g/(15 g+60 g)×100=20 wt %. The total amount of the solvent passed through the biomass was 75 g/6 g=12.5 times the weight of the biomass solids content. The biomass conversion, determined by subtracting the biomass solids content remaining in the liquefaction reactor after the liquefaction from the charged biomass solids content, was 99 wt %; and the liquefied fuel conversion, determined as the ratio of the amount of the biomass contained in the 1-butanol phase to the charged biomass solids content, was 96 wt %.

Example 2

The same operation as that in Example 1 was performed except that the moisture content in the solvent including the moisture contained in the biomass was adjusted to 10 wt %. As a result, the biomass conversion was 83 wt %, and the liquefied fuel oil conversion was 83 wt %.

Example 3

The same operation as in Example 1 was performed except that the liquefaction temperature was set to 350° C. As a result, the biomass conversion was 96 wt %, and the liquefied fuel oil conversion was 88 wt %.

Example 4

The same operation as in Example 1 was performed except that xylene was used instead of 1-butanol as the organic solvent. As a result, the biomass conversion was 91.9 wt %, and the liquefied fuel oil conversion was 85.0 wt %.

Example 5

The same operation as in Example 1 was performed except that modified xylene was used instead of 1-butanol as the organic solvent. The modified xylene as used herein was a mixed solvent containing C6-C12 aromatic hydrocarbons in addition to xylene (C8), and had the composition shown in Table 1. After the liquefaction, the biomass conversion was 91.0 wt %, and the liquefied fuel conversion was 84.0 wt %, which were substantially equal to the values obtained using xylene alone (Example 4).

TABLE 1

| C6  | C7  | C8   | C9   | C10  | C11-C12 |
|-----|-----|------|------|------|---------|
| 5.4 | 4.7 | 46.3 | 11.1 | 30.3 | 2.2     |

Unit: mol %

Each of the products obtained by the liquefaction according to the above-described Examples 4, 5, and 1 was contacted with a zeolite as a dehydration catalyst at 300° C. The proportions of the oily component, aqueous-phase component, and gaseous component in the resulting reformates are shown in Table 2. As is clear from Table 2, in Example 1, the proportions of the aqueous-phase component and gaseous component are high because the 1-butanol deteriorated due to the dehydration catalyst; whereas in Examples 4 and 5 that used xylene, oily components were efficiently obtained without deterioration of the solvents. Therefore, in Examples 4 and 5, high recovery rates can be achieved when recycling the solvents.

TABLE 2

|           |                 | Oily component | Aqueous-phase component | Gaseous component |
|-----------|-----------------|----------------|-------------------------|-------------------|
| Example 4 | Xylene          | 91.1           | 0.8                     | 8.1               |
| Example 5 | Modified xylene | 91.5           | 0.8                     | 7.7               |
| Example 1 | 1-Butanol       | 25.0           | 27.7                    | 47.3              |

Unit: wt %

Furthermore, the aromatic content and 1-butanol content in each oily component are shown in Table 3. In Examples 4 and 5 that used xylene, the aromatic contents were found to be high.

TABLE 3

|           | Aromatics | 1-Butanol |
|-----------|-----------|-----------|
| Example 4 | 98.9      | 0.0       |
| Example 5 | 98.8      | 0.0       |
| Example 1 | 28.0      | 0.3       |

Unit: wt %

Example 6

The same operation as in Example 1 was performed except that n-dodecane was used instead of 1-butanol as the organic solvent. As a result, the biomass conversion was 82 wt %, and the liquefied fuel conversion was 81 wt %.

Example 7

The same operation as in Example 1 was performed except that the flow rate of 1-butanol was set to 30 g/h, and the flow rate of water was set to 7 g/h. Furthermore, 5 g of a dehydration catalyst H-ZSM-5 (manufactured by Süd-Chemie AG) adjusted to a particle size of 1 mm or less was charged into the upper stage of the biomass layer in the reactor, and liquefaction and dehydration were simultaneously performed. As a result, the biomass conversion was 99 wt %, and the liquefied fuel conversion was 90 wt %.

Example 8

The same operation as in Example 1 was performed except that n-hexadecane was used instead of 1-butanol as the organic solvent. As a result, the biomass conversion was 75 wt %, and the liquefied fuel conversion was 67 wt %.

Comparative Example 1

The same operation as in Example 1 was performed except that the moisture content in the solvent including the moisture contained in the biomass was adjusted to 50 wt %. As a result, the biomass conversion was 99 wt %, and the liquefied fuel conversion was 43 wt %. It is assumed that in Comparative Example 1, the high moisture content in the solvent increased the aqueous phase that did not convert into a fuel, resulting in a low fuel conversion.

Comparative Example 2

The same operation as in Example 1 was performed except that the liquefaction temperature was set to 240° C. As a result, the biomass conversion was 53 wt %, and the liquefied fuel conversion was as low as 23 wt %.

INDUSTRIAL APPLICABILITY

According to the present invention, a liquefied fuel oil can be produced from biomass as a feedstock, using a relatively inexpensive liquefaction apparatus. Furthermore, a good balance can be maintained between the liquefaction of water-insoluble lignin and the liquefaction of water-soluble cellulose, enabling the yield of the liquefied fuel oil based on the biomass solids content to be improved. Furthermore, a liquefied fuel oil in which the content of ash derived from an alkali catalyst and the like is low can be produced.

Furthermore, the proportions of the aqueous-phase component and gaseous component are reduced by performing liquefaction using an aromatic hydrocarbon solvent such as xylene, enabling a high-heat-value liquefied fuel oil to be efficiently produced as the final product. Furthermore, the recovered aromatic hydrocarbon solvent can be recycled.

The liquefied fuel oil produced by the production method of the present invention can be utilized as a fuel oil for automobiles or motorbikes, or as a fuel oil for boilers and power generators. Moreover, because the liquefied fuel oil produced is derived from biomass, it has a zero carbon dioxide emission count, thereby making a contribution to improving global environmental problem such as global warming.

All of the publications, patents, and patent applications are incorporated by reference herein in their entirety.

The invention claimed is:

1. A method for producing a liquefied fuel oil, comprising adding, to biomass comprising lignocellulose, a solvent comprising an organic solvent and having a moisture content adjusted to 10 to 25 wt %, including the moisture contained in the biomass, and liquefying the biomass at a temperature of 250 to 350° C., wherein the organic solvent is n-dodecane or n-hexadecane, and wherein the moisture content is calculated based on the formula:

(the moisture content)=(moisture content in the biomass+amount of water fed to the biomass)/(the moisture content in the biomass+the amount of water fed to the biomass+the amount of the organic solvent)×100 (wt %).

2. The method for producing a liquefied fuel oil according to claim 1, wherein the solvent is added in an amount 5 to 20 times the weight of the solids content of the biomass.

3. The method for producing a liquefied fuel oil according to claim 1, wherein the solvent comprises neither an acid catalyst nor an alkali catalyst.

4. The method for producing a liquefied fuel oil according to claim 1, wherein a liquefied fuel oil after liquefaction is contacted with a dehydration catalyst, thereby dehydrating the liquefied fuel oil.

* * * * *